United States Patent

Miller

[15] 3,691,874

[45] Sept. 19, 1972

[54] AUTOMATIC FEED CONTROL FOR SAW GRINDER

[72] Inventor: Ivan Clay Miller, 1509 Helen Ave., Missoula, Mont. 59801

[22] Filed: Jan. 25, 1971

[21] Appl. No.: 109,327

[52] U.S. Cl. .................................. 76/41, 51/52 R
[51] Int. Cl. .................................. B23d 63/12
[58] Field of Search ............... 76/41, 37, 40; 51/52 R

[56] References Cited

UNITED STATES PATENTS 2,588,263  3/1952  Matthewman ............... 76/41

*Primary Examiner*—Bernard Stickney
*Attorney*—Wells, St. John & Roberts

[57] ABSTRACT

An automatic feed control is described for controlling the operation of a grinding machine having a diamond abrasive wheel for grinding carbide teeth of a circular saw. The automatic feed control automatically advances the diamond wheel after the saw blade has been rotated a selected number of revolutions until the carbide teeth have been ground to a desired depth. The feed is automatically terminated and the operation of the machine continued until the saw blade has rotated a selected number of revolutions to remove any high spots that may remain.

6 Claims, 9 Drawing Figures

AUTOMATIC FEED CONTROL FOR SAW GRINDER

BACKGROUND OF THE INVENTION

This invention relates to grinders for sharpening saw blades and more particularly to automatic feed control means for operating the grinding machines.

Circular saw blades having carbide teeth are much more difficult to sharpen than tempered steel blades. It normally takes a grinding wheel having a diamond abrasive material to sharpen the carbide teeth. Such diamond wheels are very expensive and are very susceptible to damage. If the diamond wheel is fed too fast into the carbide teeth, the diamond particles will be rolled out of the binder destroying the effectiveness of the wheel. Consequently, the diamond wheel is normally fed by hand, requiring an operator to stand over the machine to watch the operation and to manually advance the feed after each revolution of the saw blade.

One of the principal objects of this invention is to provide an automatic feed means for a grinding machine for sharpening circular saw blades having carbide teeth that feed a diamond wheel sequentially to uniformly grind the carbide teeth to a desired depth without the manual manipulation and attention of an operator.

An additional object of this invention is to provide an automatic feed means for a grinding machine that sequentially grinds the carbide teeth of a circular saw to the desired depth automatically.

A further object of this invention is to provide an automatic feed means for a grinding machine that is extremely versatile.

An additional object of this invention is to provide an automatic feed means for a grinding machine that can be adapted to a manually operated machine with a minimum of expense and without requiring substantial modification of the manual machine.

A further object of this invention is to provide an automatic feed means that is relatively inexpensive to manufacture.

These and other objects and advantages of this invention will become apparent upon the reading of the following detailed description of a preferred embodiment.

BRIEF DESCRIPTION OF THE DRAWINGS

A preferred embodiment of this invention is illustrated in the accompanying drawings, in which.

DETAILED DESCRIPTION OF THE PREFERRED EMBODIMENT

Figure 1:
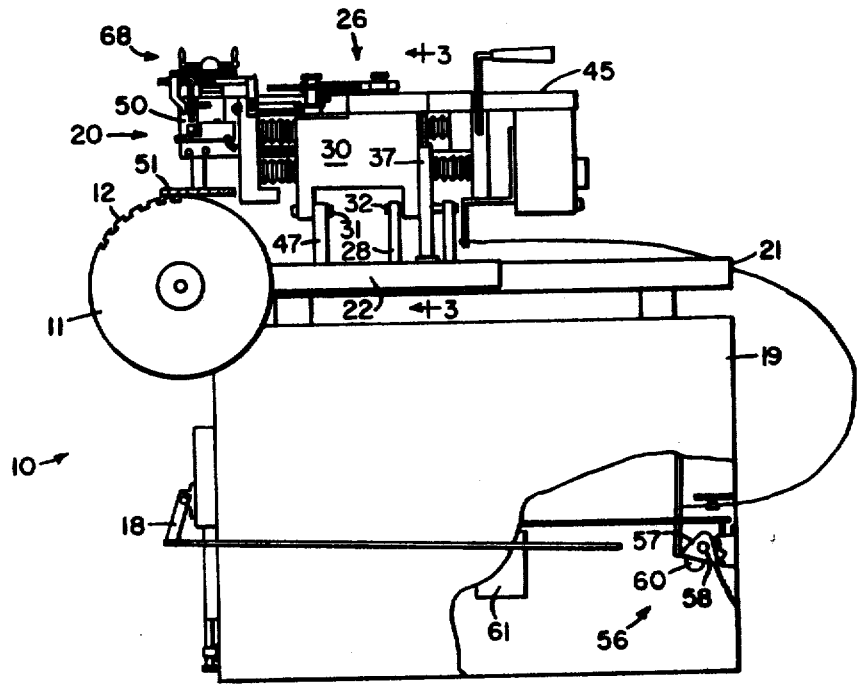
FIG. 1 is a side elevation view of a saw blade grinding machine embodying the principal features of this invention.
Figure 2:
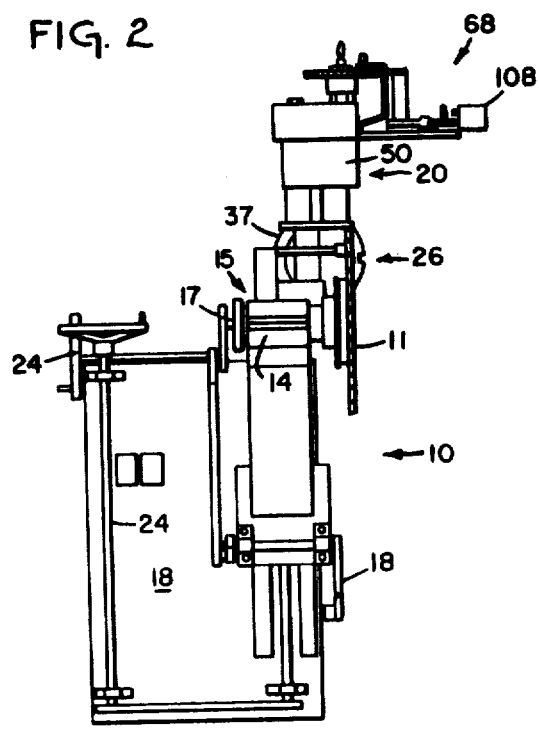
FIG. 2 is an end elevation view of the grinding machine illustrated in FIG. 1.
Figure 3:
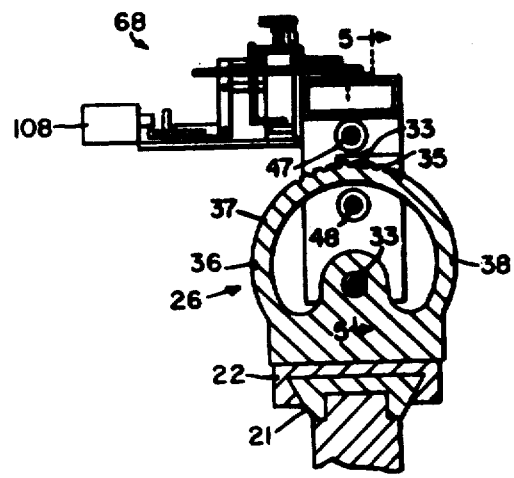
FIG. 3 is a vertical cross-sectional view taken along line 3—3 in FIG. 1.
Figure 4:
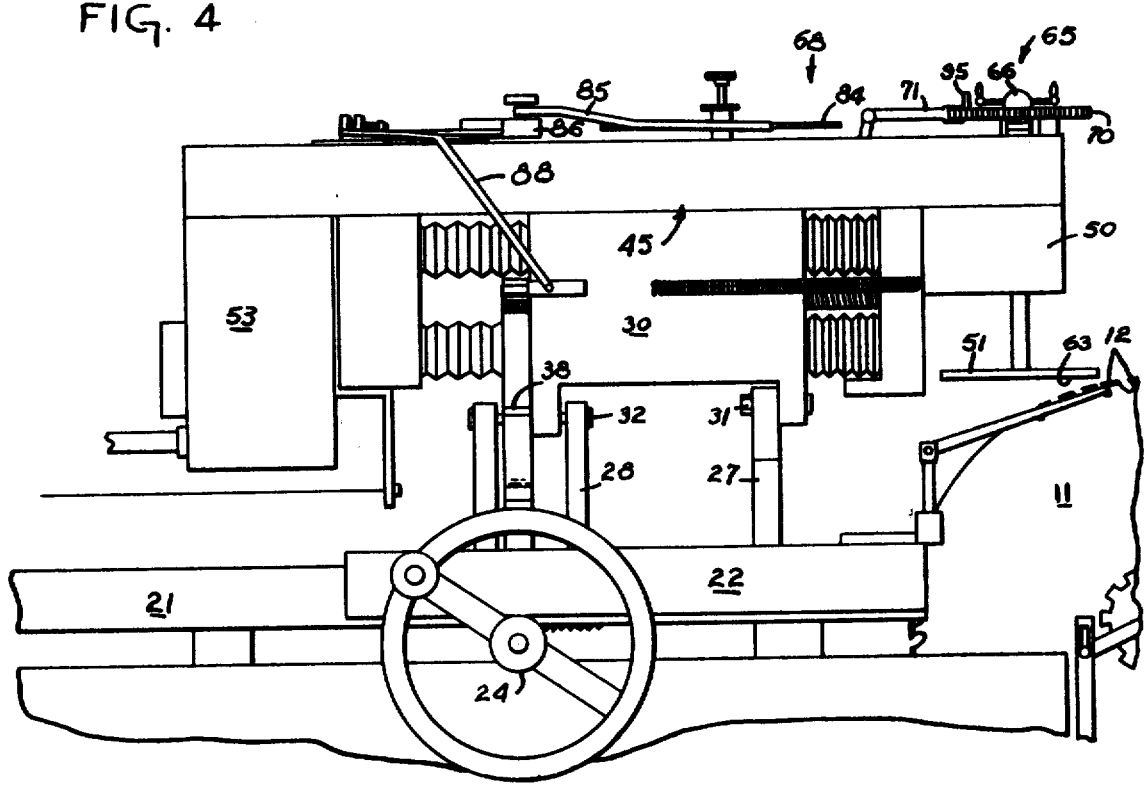
FIG. 4 is an enlarged fragmentary side elevation view of the opposite side of that shown in FIG. 1.
Figure 5:
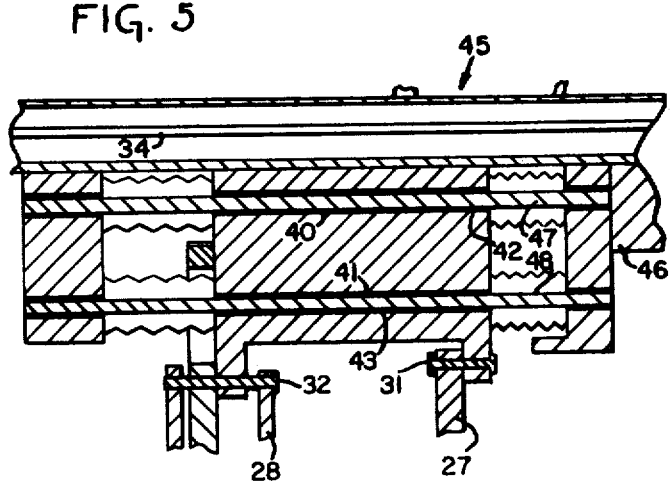
FIG. 5 is a vertical cross-sectional view taken along line 5—5 in FIG. 3.
Figure 6:
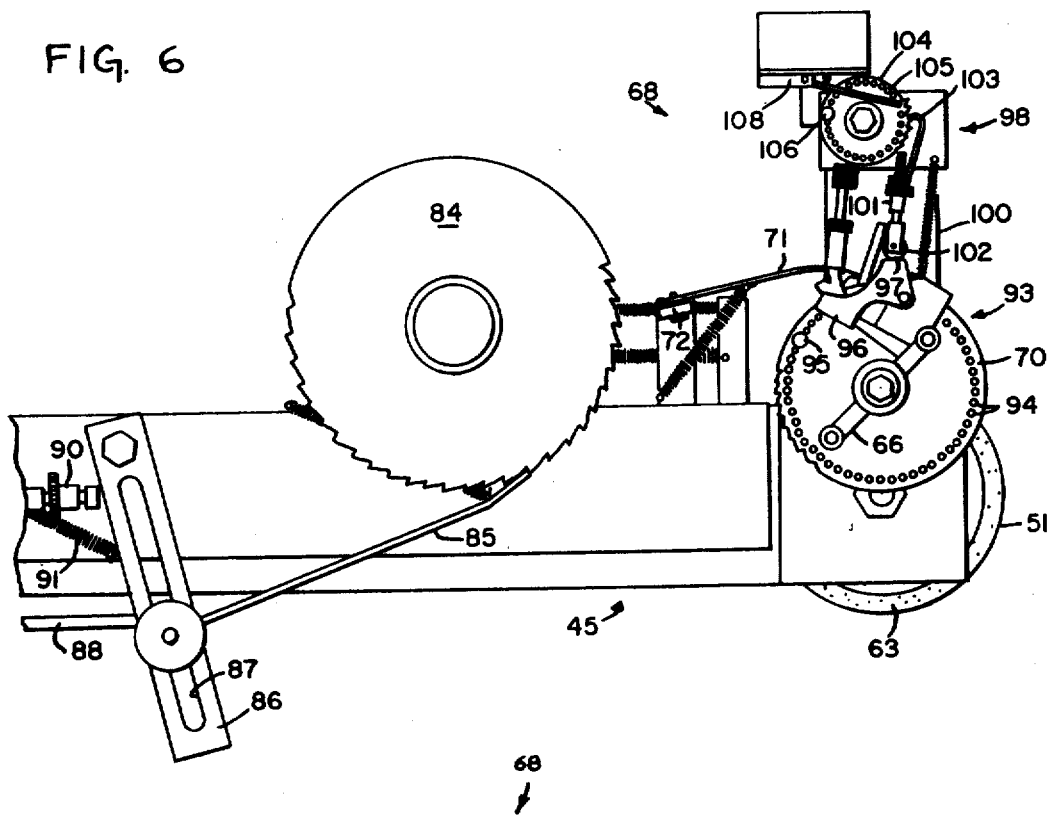
FIG. 6 is an enlarged fragmentary top view.
Figure 7:
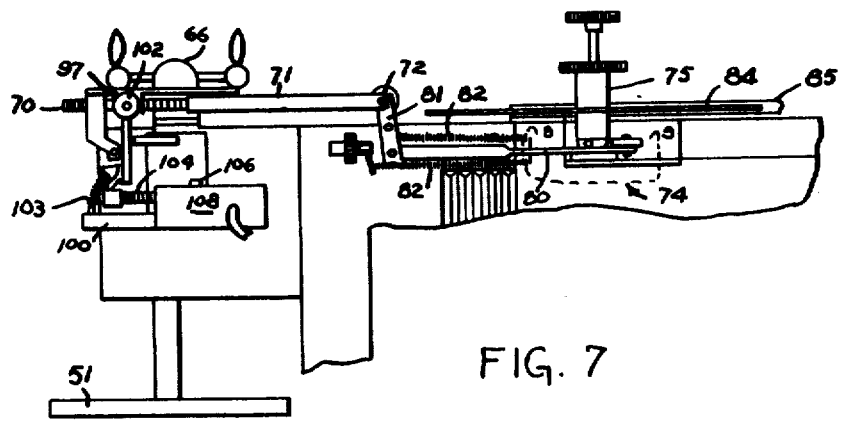
FIG. 7 is an enlarged fragmentary side view taken from the same side as that shown in FIG. 1.
Figure 8:
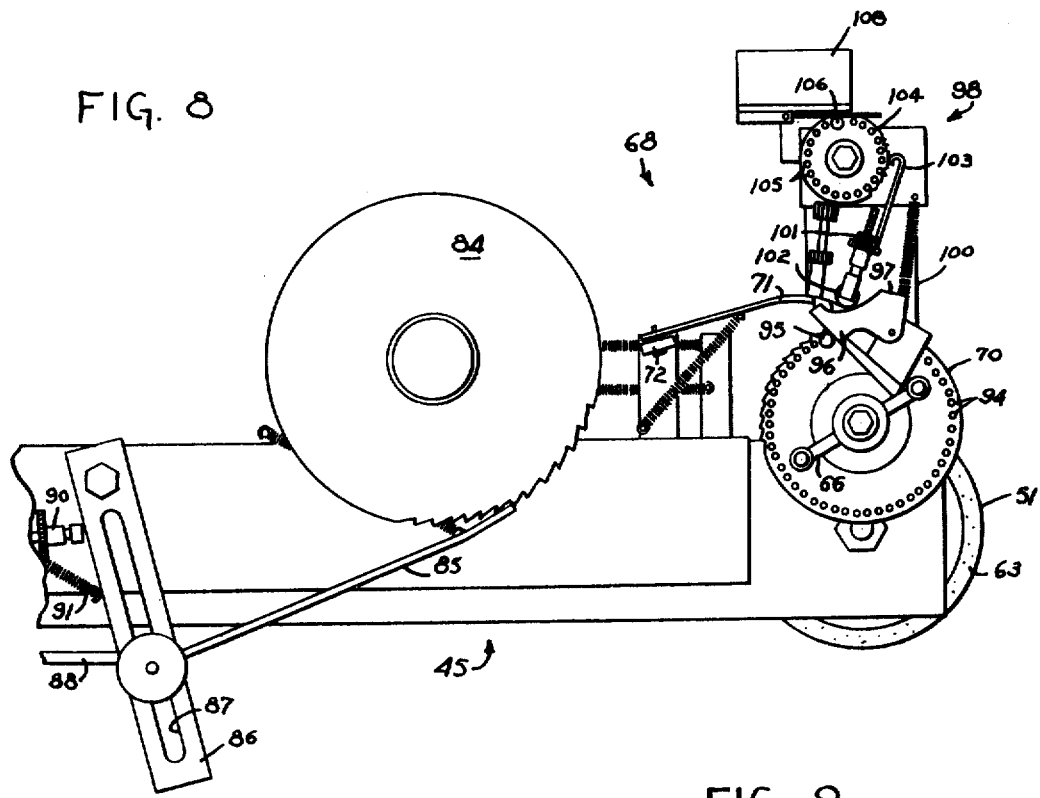
FIG. 8 is an enlarged fragmentary view similar to FIG. 6, except showing a subsequent step to that shown in FIG. 6.
Figure 9:
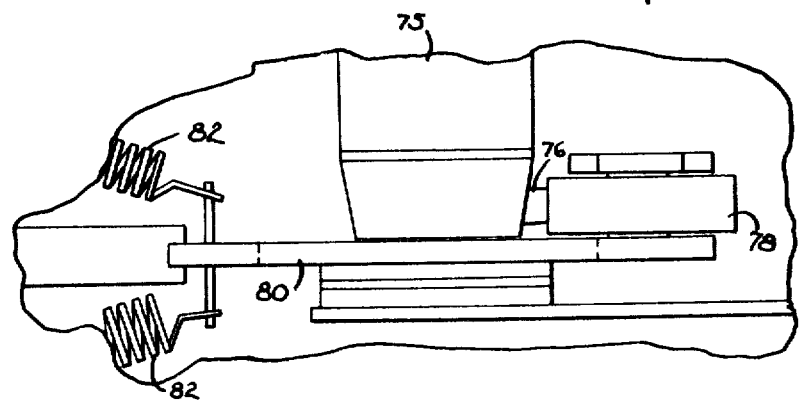
FIG. 9 is an enlarged isolated view taken from FIG. 7.

Referring now to the drawings, there is a grinding machine generally designated by the numeral 10 for sharpening a circular saw blade 11 having a plurality of carbide teeth 12.

The grinding machine 10 includes a saw support mechanism 14 for rotatably supporting the circular saw 11 on the machine. The support mechanism is vertically movable to adjust the position of the saw blade. The machine further has an indexing means 15 associated with the saw support mechanism for incrementally rotating the saw blade. The indexing means is adjustable to rotate the saw blade in relation to the number and spacing of the carbide teeth. The indexing means 15 includes a ratchet drive 17 for intermittently incrementally rotating the saw blade as the grinding operation proceeds. The indexing means 15 includes adjustable linkage 18 for moving the ratchet drive. The linkage 18 may be adjusted according to the size and number of teeth of the saw blade to incrementally index the saw blade to successively position the carbide teeth to be ground at a grinding station. The saw blade support 14 supports the blade in a substantially vertical plane with the indexing means 15 rotating the blade within the plane.

The grinding machine 10 includes a grinding wheel assembly 20 being capable of grinding the carbide teeth as the teeth are indexed to the grinding station. The grinding wheel assembly is movably mounted on the frame 19 for movement parallel with the vertical plane of the saw blade. The grinding wheel assembly 20 includes a way 21 for slidably supporting a bed 22 that is movable parallel with the plane of the saw blade. A rack and pinion mechanism 24 operatively interconnects the frame and the bed 22 for adjustably positioning the bed 22 in relation to the saw blade.

The grinding wheel assembly 20 includes an angular orientation mechanism 26 for angularly orienting the grinding wheel assembly 20 in relation to the saw blade to be able to grind various surfaces of the carbide teeth. The angular orientation mechanism 26 includes pillow blocks 27 and 28 affixed on the bed 22. The pillow blocks rotatably support shafts 31 and 32 respectively. A carriage support 30 is affixed on the shaft 31 and 32 for rotating about an axis defined by the shafts 31 and 32 with the axis substantially horizontal and falling within the plane of the saw blade. The carriage support 30 is angularly adjustable about a ring 37 that is mounted on the bed 22 in a transverse direction to the plane of the saw blade. The ring 37 includes a plurality of gear teeth 35 mounted on the upper part of the periphery of the ring 37. Side notches 36 and 38 are mounted on the sides of the ring 37 at diametrically opposed positions. A detent mechanism 33 is carried by the carriage support 30 for adjustably fixing the carriage support at a desired angular orientation about the rotational axis with the detent mechanism 33 residing between two of the teeth 35 or in the notches 36 and 38. The detent 33 is movable in and out of teeth so that the operator may easily adjust the angular orientation of the carriage support about the axis defined by the shafts 31 and 32 to enable various surfaces of the carbide teeth to be ground.

Bores 40 and 41 are formed in the carriage support 30 in a substantially horizontal orientation parallel with the axis of the shafts 31 and 32. Slide bearings 42 and 43 are mounted in the bore 40 and 41. A grinding wheel carriage 45 is movably mounted on the carriage support 30 for reciprocal movement parallel with the axis of the shaft 31 and 32 to and from the saw blade, the carriage 45 includes a frame 46 having two parallel rods 47 and 48 slidably mounted in the slide bearings 42 and 43 respectively. A spindle assembly 50 is movably mounted on the carriage 46 for lateral movement in a direction perpendicular to the movement of the carriage 45 and intersecting the axis of the shafts 31 and 32. The spindle assembly 50 has a grinding wheel 51 rotatably mounted on the end thereof for grinding surfaces of the carbide teeth. The grinding wheel 51 may be moved in a lateral direction to the axis defined by the shafts 31 and 32 for feeding the grinding wheel with respect to the carbide teeth to grind various amounts from the selected surfaces. The grinding wheel 51 is rotated by a power drive means 53 that is mounted on the carriage 45. The power drive means 50 includes a motor and belt drive 54.

The intersection of the reciprocal movement of the grinding wheel and the saw blades defines the grinding station.

The carriage 45 is reciprocally moved by a carriage drive 56. The carriage drive 56 includes a cam 57 mounted on a shaft 58 that reciprocates the carriage 45 as the shaft is rotated. The indexing means 15 is operated by a cam 60 that is mounted on the shaft 58 to reciprocate the linkage 18 each time the shaft 58 is revolved. The shaft 58 is rotated by a motor 61. The cams 57 and 60 are angularly positioned to cause the indexing means 15 to index the saw blade when the carriage 45 is in a fully retracted position spaced from the saw blade.

The grinding wheel 51 has diamond abrasive particles 63 embedded in a binder for performing the grinding action on the carbide teeth. The rate and depth of feed of the grinding wheel 51 is extremely important to prevent the diamond particles from being rolled out of the binder during the grinding operation.

The grinding wheel assembly includes a manual feed means 65 that has a handle 66 mounted on the spindle assembly enabling the spindle assembly to be moved incrementally by hand to feed the grinding wheel to various lateral positions during the grinding operation.

Most importantly, the machine further includes an automatic feed means 68 associated with the spindle assembly 50 for automatically feeding the grinding wheel laterally to uniformly grind the carbide teeth in a manner that is not destructive to the diamond grinding wheel 51. The automatic feed means 68 enables one operator to easily handle several grinding machines at the same time which greatly increases his productivity with less human error.

The automatic feed means includes a ratchet wheel 70 affixed to the spindle assembly 50. An associated pawl 71 is mounted on the carriage frame 45 for incrementally rotating the ratchet wheel 70 in response to the reciprocating movement of the carriage 45. The pawl 71 is mounted on the end of a pivot lever 72.

The pawl 71 and ratchet wheel 70 are incrementally moved by an operating means 74. The operating means 74 includes a shaft 75 that is rotatably mounted on the frame 45. The shaft 75 has a cam lobe 76 formed thereon for moving a cam follower 78. The cam follower 78 includes a ring 80 movably mounted on the frame 46 and connected to an arm 81. The arm 81 is affixed to the pivot lever 72. Springs 82 are mounted to the pivot lever 72 to bias the cam follower 78 against the shaft 75. The cam lobe 76 is designed to move the cam follower 78 once for every revolution of the shaft 75 to operate the pawl 71 and the ratchet wheel 70. The ratchet wheel 70 and the pawl 71 are designed to move the spindle assembly 50 in the lateral direction an incremental desired distance each time the ratchet wheel 70 is operated. Under some circumstances, it is desirable to design the ratchet wheel 70 and the pawl 71 to move the spindle assembly 50 approximately one-thousandth of an inch in the lateral direction each time the ratchet wheel 70 is operated.

A ratched wheel 84 is mounted on the shaft 75 and is incrementally rotated by a pawl 85. The number of teeth on the ratchet wheel 84 corresponds to the number of teeth on the saw blade 11 or a multiple thereof. The pawl 85 is mounted on a pivot arm 86. The pivot arm 86 includes a slot 87 for providing adjustment in the stroke of the pawl 85. A drive arm 88 is connected to the pivot arm 86 for pivoting the pivot arm and reciprocating the pawl 85. The drive arm 88 is connected to the carriage support 30 so that the pivot arm 86 is pivoted each time the carriage 45 is reciprocated to incrementally move the ratchet wheel 84. For each revolution of the ratchet wheel 84, the lobe 76 engages the cam follower 78 once to move the pawl 71 and rotate the ratchet wheel 70 forward one tooth to advance the grinding wheel.

Adjustable stop 90 is provided for limiting the stroke of the pivotal arm 86. A spring 91 is connected between the frame 46 and the pawl 85 to biasly maintain the pawl 85 in engagement with the ratchet wheel 84.

It has been found that a saw blade corresponding to the saw blade being ground provides an excellent ratchet wheel 84. Such a ratchet wheel has the same number of teeth as the saw blade being sharpened. The correspondence between the ratchet wheel 84 and the saw blade 11 is very important so that the shaft 85 is rotated one revolution for each revolution of the saw blade to cause the grinding wheel 51 to advance so that the desired incremental distance after completion of a grinding operation of the teeth in preparation for a succeeding grinding operation.

The automatic feed means 68 includes a feed stop means 93 for stopping the feed of the grinding wheel after the grinding wheel has been advanced to the desired depth to properly sharpen the teeth. The feed stop means 93 includes a plurality of holes 94 evenly spaced along the periphery of the ratchet wheel 70. The holes 94 correspond to the number of teeth on the ratchet wheel 70. A pin 95 is mounted in one of the holes for engaging a pawl lift 96 pivotally mounted on the frame 46. The pawl lift 96 has a ledge 97. When the pin 95 is moved into engagement with the pawl lift 96 the pawl lift 96 is rotated to lift the pawl 71 from engagement with the ratchet wheel 70. The pin 95 is positioned in a hole corresponding to the desired total feed of the grinding wheel. For an example, when the incremental movement of the ratchet wheel 70 corresponds to a feed of one-thousandth of an inch, each hole corresponds likewise to the thousandth of an inch. If it is desired to grind each tooth indexed to the grinding station to six-thousandths of an inch, then the pin 95 is initially positioned in the sixth hole from the pawl lift 96. During the operation the automatic feed means 68 will automatically advance the grinding wheel one-thousandth of an inch after each revolution of the saw blade until the wheel has been advanced to six-thousandths of an inch. When this occurs, the pin 95 engages the pawl lift 96 and renders the pawl 71 and ratchet 70 combination inoperative to further index or advance the grinding wheel into the saw blade.

The automatic feed means 68 also includes a finishing control means 98 for continuing the operation of the machine for a desired number of cycles to remove any high spots that may have been formed on the carbide teeth due to variance of the hardness of the carbide material between various teeth. The finishing control means 98 includes a pivot frame 100 pivotally mounted on the frame 46. Pivot frame 100 includes an arm 101 having a cam follower 102 mounted on one end thereof and normally resting on the ledge 97. A pawl 103 is mounted on the other end of the arm 101 and engages a ratchet wheel 104. The ratchet wheel 104 has a plurality of holes 105 formed along the periphery thereof. A pin 106 takes a position in one of the holes. A microswitch 108 is mounted on the frame 46 to be operated by the movement of the pin 106 on the ratchet wheel 104.

As the pawl 71 is moved from the ratchet wheel 70 by the pivotal movement of the pawl lift 76, the ledge 97 moves out from underneath the cam follower 102. When this occurs, cam follower 102 moves downwardly into the path of the pawl 71. When the pawl 71 is reciprocated after each revolution of the shaft 75, the pawl 71 acts as a cam engaging the cam follower 102 to pivot the arm 101 to cause the pawl 103 to move the ratchet wheel 104 one increment. The pin 106 is positioned in a hole corresponding to the desired number of revolutions to be made by the saw blade to provide the finishing grinding touches to remove any high spots. For example, if it is desired to have the saw blade rotate six times during the finishing operation, then the pin 106 is positioned in the sixth hole from the switch 108 and shuts off the motor 61 to stop the reciprocation of the carriage 45 and the indexing of the saw blade.

In this specific embodiment shown the cam 57 is formed with two lobes having a shallow dwell inbetween to cause the carriage 45 to move forward in a full stroke to the grinding station and then to make two short passes at the grinding station to move the grinding wheel against each saw tooth twice during one full stroke of the carriage. In this particular embodiment the automatic feed means is designed to index the ratchet wheel 84 once during each full stroke of the carriage 45.

To operate the grinding machine 10 a dull circular saw is mounted on the saw support 14. A corresponding ratchet wheel 84 is mounted on the shaft 75 so that the grinding wheel will index the desired incremental distance each time the saw blade makes one revolution or each time the saw blade makes a selected number of revolutions. In this embodiment, the automatic feed means is designed to advance the grinding wheel after each revolution of the saw blade.

After the saw blade is mounted, the carriage 95 is then oriented in an angular position about the axis of the shafts 31 and 32 to orient the grinding wheel with respect to the desired surface to the ground on each carbide tooth indexed to the grinding station. If it is desired to grind the side of the tooth, then the carriage 45 is moved on the ring 34 until the detent 38 resides in one of the notches 36 or 37, depending upon which side of the tooth is to be ground. If the face or the back of the tooth is to be ground, then the detent is moved to reside inbetween two of the gear teeth 35 depending upon the desired angle to be cut.

If it is desired to advance the grinding wheel three-thousandths of an inch then the pin 95 is positioned in the third hole away from the pawl lift 96. If it is desired to advance the grinding wheel six-thousandths of an inch, then the pin 95 is positioned in the sixth hole from the pawl lift 96. Depending upon experience, the operator may desire to operate the machine for additional revolutions of the saw blade to remove any high spots left on the teeth after the normal grinding. In this case, the operator will position the pin 106 in the hole corresponding to the number of additional cycles he desires to have the machine run.

When the machine is energized the carriage 45 is moved in a reciprocal motion to bring the grinding wheel into grinding contact with a surface of a tooth positioned at the grinding station. As the carriage moves to a retracted position to its full stroke, the cam 60 moves the linkage 18 to index the saw blade incrementally forward to position a succeeding tooth at the grinding station. During each reciprocal motion of the carriage the ratchet wheel 84 is moved forward one increment. When the saw blade has made one revolution the cam lobe 76 moves the cam follower 78 to move the ratchet wheel 84 forward one tooth to move the spindle assembly 50 laterally inward to reposition the grinding wheel a preset distance closer to the axis defined by the shaft 31 and 32. This operation is continued until the pin 95 engages the pawl lift 96 and renders the pawl 71 inoperative to move the ratchet wheel 70. However, when the pawl lift 76 is pivoted the ledge 97 moves out from underneath the cam follower 102 and the cam follower 102 presents itself in line of the movement of the pawl 71 so that when the pawl 71 is again moved by the cam lobe 76 it will operate the pawl 103 and the ratchet 104. When the desired number of revolutions are completed to finish the grinding for removing the high spots the pin 106 engages the switch 108 to stop the operation of the machine. The operator then removes the sharpened blade or resets the grinding wheel assembly to grind other surfaces of the carbide teeth. When the sharpening is completed the saw blade is removed and a dull blade is mounted on the machine for sharpening.

It should be understood that the above described embodiment is simply illustrative of the principles of this invention and that numerous other embodiments may be readily devised by those skilled in the art without deviating therefrom. Therefore, only the following claims are intended to define this invention.

What is claimed is:

1. In a grinding machine for sharpening circular saw blades, having carbide teeth:

a frame;

an indexing means mounted on the frame for supporting and sequentially incrementally rotating the saw blade to position the carbide teeth one at a time at a grinding station;

a power driven grinding wheel having diamond abrasive material thereon for sharpening the carbide teeth, in which the grinding wheel is mounted on the frame for reciprocal movement to and from the grinding station and for lateral movement with respect to the reciprocal movement to laterally position the grinding wheel to grind a carbide surface of the saw tooth to remove material from the surface when the grinding wheel is moved to the grinding station; and drive means for reciprocating the grinding wheel;

in which the improvement comprises an automatic feed means operatively connected to the grinding wheel and responsive to the rotation of the saw blade for automatically laterally advancing the grinding wheel each time the saw blade is rotated a selected number of revolutions to uniformly grind the surface of each tooth indexed to the grinding station to a desired depth;

said automatic feed means includes a drive means for laterally advancing the grinding wheel a preset distance each time the lateral drive means is operated and a control means for operating the drive means each time the saw blade is rotated the selected number of revolutions; and said control means includes a feed stop means responsive to the operation of the lateral drive means for rendering ineffective the lateral drive means when the lateral drive means has been operated a preset number of times to automatically stop the further feeding of the grinding wheel when the desired depth is reached.

2. In the grinding machine defined in claim 1 wherein the control means includes an operating means responsive to the reciprocal movement of the grinding wheel for operating the drive means each time the grinding wheel reciprocates a number of times corresponding to the number of incremental movements of the saw blade required to rotate the saw blade the selected number of revolutions.

3. In the grinding machine defined in claim 1 wherein the control means includes a finishing grinding means responsive to the reciprocal movement of the grinding wheel for continuing the operation of the reciprocal drive means and the indexing means until the saw blade has been rotated a preset number of revolutions after the lateral drive means has been rendered ineffective to grind any high spots from the ground teeth before rendering the reciprocal drive means and indexing means inoperative.

4. In the grinding machine as defined in claim 1 wherein the feed drive means includes (1) a rotatably mounted ratchet wheel operatively connected to the grinding wheel for laterally advancing the grinding wheel in response to the rotation of the ratchet wheel; (2) a reciprocally mounted pawl normally engaging the ratchet wheel to rotate the ratchet wheel a desired increment each time the pawl is reciprocated; and said control means being operatively connected to the pawl to reciprocate the pawl each time the saw blade is rotated the selected number of revolutions.

5. In the grinding machine as defined in claim 4 wherein the feed stop means includes means for disengaging the pawl from the ratchet wheel when the ratchet wheel has rotated a desired number of increments.

6. In the grinding machine as defined in claim 5 wherein the control means includes a finishing grinding means responsive to the disengagement of the pawl and ratchet wheel for continuing the operation of the reciprocating drive means and the indexing means until the saw blade has been rotated an additional preset number of revolutions to grind any high spots from the carbide teeth.

* * * * *